May 24, 1932.  H. P. TRUSTY  1,859,542
LIFE PRESERVING MECHANISM FOR AIRSHIPS
Filed Oct. 8, 1929  5 Sheets-Sheet 1

Inventor;
Harry P. Trusty,
By Alan Franklin
His Attorney.

May 24, 1932. H. P. TRUSTY 1,859,542
LIFE PRESERVING MECHANISM FOR AIRSHIPS
Filed Oct. 8, 1929 5 Sheets-Sheet 3

May 24, 1932. H. P. TRUSTY 1,859,542
LIFE PRESERVING MECHANISM FOR AIRSHIPS
Filed Oct. 8, 1929  5 Sheets-Sheet 4

INVENTOR.
HARRY P. TRUSTY.
BY Alan Franklin
HIS ATTORNEY.

Patented May 24, 1932

1,859,542

UNITED STATES PATENT OFFICE

HARRY P. TRUSTY, OF LOS ANGELES, CALIFORNIA

LIFE PRESERVING MECHANISM FOR AIRSHIPS

Application filed October 8, 1929. Serial No. 398,167.

This invention relates to life preserving mechanism for airships, and particularly passenger airships.

The general object of the invention is to provide a mechanism, controlled by the pilot of an airship, by means of which passengers may be safely discharged in parachutes from the airship in case of an emergency.

A more particular object is to provide an airship life preserving mechanism, which will close the doors of the airship cabin immediately after the passengers are discharged, in parachutes from the cabin, to prevent wrecking of the airship by the pressure of air which is produced in the cabin when the doors thereof are left open.

A further object is to provide an airship life preserving mechanism of the character stated which will be practical, safe and efficient in operation.

Other objects and advantages will appear hereinafter.

The invention is illustrated in the annexed drawings which form a part of this specification and in which.

Corresponding parts are designated by the same reference characters in all the figures.

Figure 1:
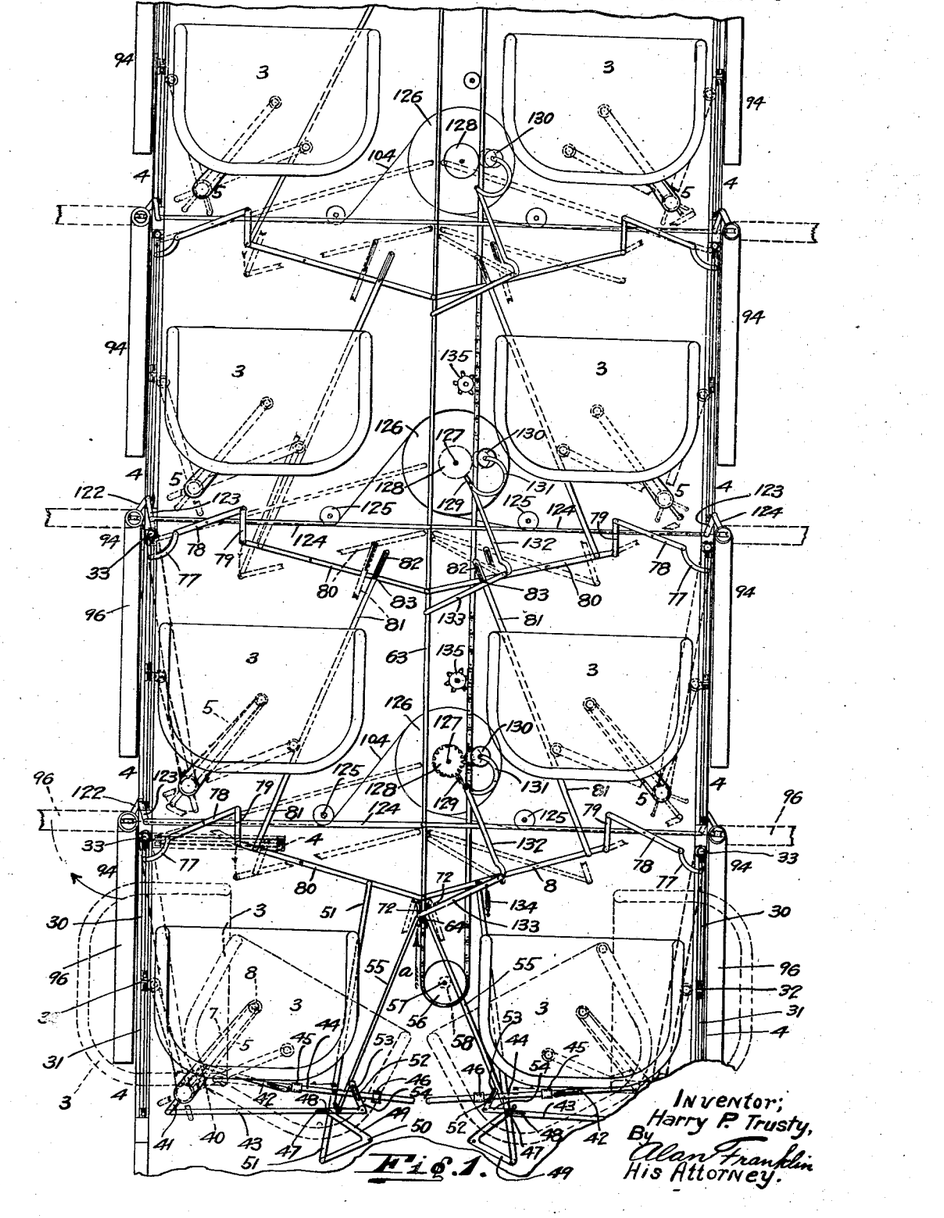
Fig. 1 is a horizontal section of the cabin of an airship embodying my invention.
Figures 2, 3, 7, 8, 15:
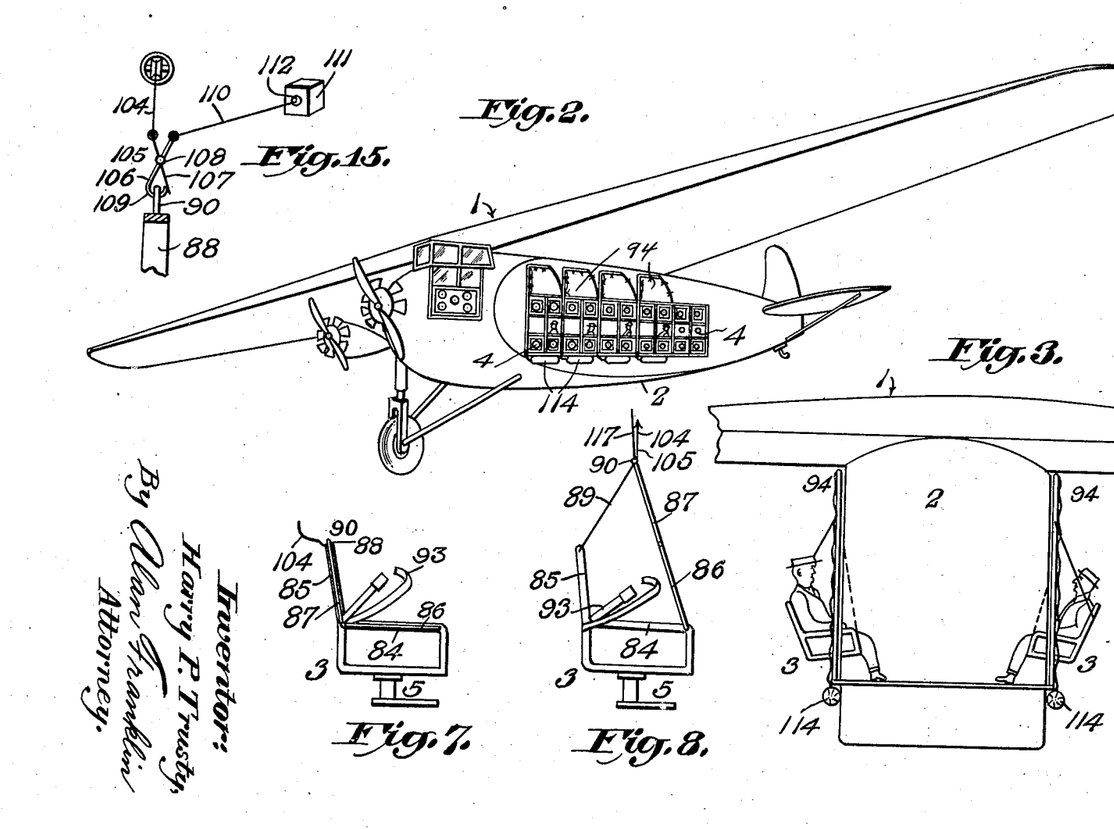
Fig. 2 is a perspective view of an airplane constructed with a cabin embodying my invention as illustrated in Fig. 1.
Fig. 3 is a transverse vertical section of the cabin of the airship as shown in Figs. 1 and 2, illustrating two passengers swung in their seats by my mechanism partly outwardly from the cabin through open doors at the sides respectively of the cabin in the act of being discharged in parachutes from the airship.
Fig. 7 is a side elevation of one of the passenger chairs of the airship cabin with the elevating cable and the parachute rope shown slack.
Fig. 8 is a view like Fig. 7 except that the elevating cable and seat hanger are shown drawn taut in the act of elevating the chair from its mounting for discharging the chair and its occupant from the airship in a parachute.
Fig. 15 is an enlarged elevation of the seat trip hook and operating means therefor.

In the drawings I have illustrated a passenger monoplane, designated generally 1, constructed with a passenger cabin 2, in which the passenger seats 3 and the passenger doors 4 are arranged in the usual manner, the seats being arranged in two rows at the sides respectively of the cabin, with an aisle extending between the rows, and the doors being located in the side walls of the cabin adjacent to the seats respectively.

Figure 11:
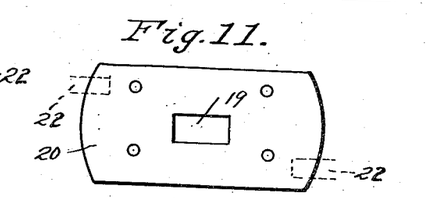
Fig. 11 is a plan view of one of the seat key plates for holding a seat on a seat standard.
Figure 12:
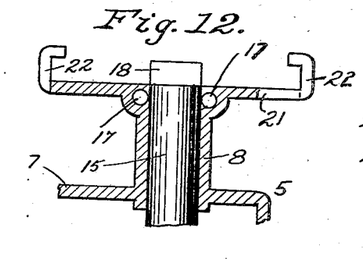
Fig. 12 is an enlarged fragmentary vertical section of the upper end of a seat standard.

Each of the seats 3 is mounted on a crank 5, which comprises a sleeve 6, a hollow crank arm 7 extending from the upper end of said sleeve and a crank standard 8 upstanding from the outer end of said crank arm. The crank 5 is journaled by means of its sleeve 6 which turnably fits within a bearing 9 depending through the floor 10 of the cabin 2, said bearing 9 being formed with an external flange 11 which rests upon and is secured to said floor, there being an end thrust ball bearing 12 interposed between said flange and the crank arm 7 upon which said arm rests and turns. A vertical shaft 13 is journaled at its lower end in a bearing 14 secured to the lower wall of the cabin 2 and extends upwardly through the crank sleeve 6 into the hollow crank arm 7 and is journaled in said sleeve. A vertical shaft 15 extends in the outer end of the crank arm 7 through the crank standard 8 and is journaled at its lower end in an end thrust bearing 16 in the lower wall of said crank arm and at its upper end in a ball bearing 17 in the upper end of said standard. The shaft 15 is formed with a key 18 on its upper end which detachably fits within a key socket 19 within a plate 20 secured to the under side of the seat 3, which plate rests upon an external flange 21 formed on the upper end of the crank standard 8, whereby the seat is detachably mounted on the upper end of said standard. Cleats 22 are secured to the edge of the flange 21 and extend upwardly adjacent opposite edges of the plate 20 and over the upper face of said plate for normally holding the seat 3 on the upper end of the standard 8, the under side of the seat being recessed at 23 to receive said cleats. Sprockets 24 and 25 are secured on the upper and lower ends of the shafts 13 and 15 respectively, over which sprockets extends a chain 26 within the crank arm 7. A sprocket 27 is secured on the lower end of the shaft 13 and one end of a chain 28 extends partly around said sprocket in a counter-clockwise direction, and is secured to said sprocket by a pin 29.

The doors 4 are each divided vertically into two sections 30 and 31, which sections are hinged together at their meeting edges by hinges 32, the section 30 being arranged forwardly of the section 31, and hinged at its forward edge to the cabin by means of a rod 33 to which said forward edge is secured, which rod is journaled at its lower and upper ends in bearings 34 and 35, respectively secured in the side wall of the cabin 2. On the inside of each of the door sections 31 near the rear edge thereof is secured a pin 36 which extends upwardly into a slotted guide 37 mounted in the upper structure of the cabin 2, whereby said section 31 is swung against the outside of the section 30 when the door 4 is swung inwardly by its hinge rod 33 into open position, as illustrated in dotted lines in Fig. 1 of the drawings, thus enabling the doors to swing open within a minimum of space. On the lower end of the door hinge rod 33 is secured a sprocket 38 over which the other end of the chain 28 partly extends, in a counter clockwise direction and is secured to said sprocket by a pin 39.

On the lower end of the sleeve 6 of each crank 5 are a pair of arms 40 and 41 to which are connected one end of links 42 and 43. The other end of link 42 is pivotally connected to one end of a draw bar 44 slidably mounted in bearings 45 and 46 secured in the lower structure of the cabin 2. The other end of the link 43 is provided with a slot 47 to receive a pin 48 on one arm of a bell crank 49 which is fulcrumed at 50 in the lower structure of the cabin 2. The other arm of bell crank 49 is connected to the rear end of a rod 51. A pin 52 projects upwardly from the draw bar 44 through a slot 53 in one arm of a bell crank 54 the other arm of said bell crank being connected to the rear end of a rod 55.

In the lower rear portion of the cabin 2 below the cabin floor 10 a sprocket 56 is secured on a sprocket shaft 57 suitably journaled in a bearing 58 in the lower structure of the cabin, and in the forward lower portion of the cabin, below the cabin floor, a sprocket 59 is secured on a vertical shaft 60 which is journaled in bearings 61 and 62 in the lower structure of the cabin. A chain 63 extends over the sprockets 56 and 59 under the floor 10 on which chain is secured a dog 64. A sprocket 65, smaller than the sprocket 59 is also secured on the shaft 60. A vertical shaft 66 is journaled at its lower end in a bearing 66' in the lower structure of the cabin 2 and extends upwardly through the floor 10 of the cabin and is journaled in another bearing 66" secured to the under side of said floor. A sprocket 67 larger than sprocket 65 is secured on the lower end of shaft 66 and a chain 68 extends over the sprockets 65 and 67. A ratchet 69 is secured on the shaft 66 immediately above the cabin floor to be engaged by a pawl 70 pivoted on said floor. A crank 71 is secured on the upper end of the shaft 66 to be grasped by the pilot of the airship to rotate the shaft 66 for operating my invention, as will be hereinafter more fully described.

A pair of slotted guide plates 72 are mounted at opposite sides of one reach of the chain 63 near each pair of seats 3 which are arranged opposite each other across the aisle therebetween, which slotted guide plates are engaged by pins 73 in the forward ends of the links 55 of the operating mechanisms of said seats respectively. The forward end of each link 55 is formed with a lug 74 which extends over the chain 63 in the path of travel of the chain dog 64 except when said links are carried forward by the engagement of said dog with said lugs to the forward ends of the guide plates 72 where the slots 75 of said guide plates are curved outwardly from the chain 63, as at 76, which curved forward ends of the slots when engaged by the pins 73 swing the forward ends of the links outwardly from the chain 63 and the lugs 74 out of engagement with the chain dog 64 to allow the dog to travel past the forward ends of said links.

The section 30 of each door 4 is connected to one end of a link 77, the other end of which link is connected to one end of a lever 78 fulcrumed in the lower structure of the cabin 2. The other end of lever 78 is connected to one end of a link 79 which is connected at its other end to one end of a lever 80 fulcrumed in the lower structure of the cabin. The other end of lever 80 rests over the chain 63 in the path of travel of the chain dog 64 when the door 4 is closed. The forward end of rod 51 for operating each seat 3 is connected to the lever 80 for operating the door adjacent the seat. A rod 81 is connected at its rear end to each lever 80, except said levers which operate the doors 4 at the forward end of the cabin, and the forward end of each of said rods is provided with a slot 82 through which projects a pin 83 on the lever 80 which operates the door forwardly of the door operated by the lever 80 to which the rear end of the rod is connected.

Figures 4, 5, 6:
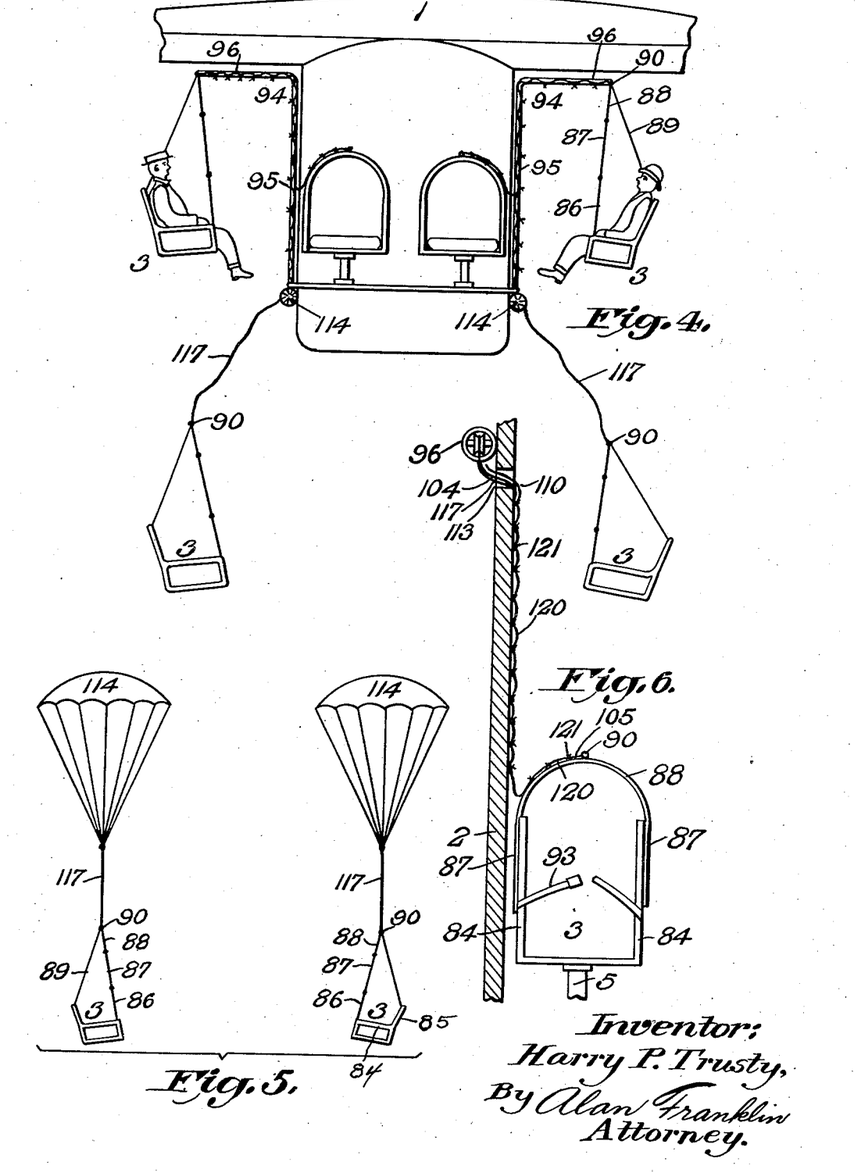
Fig. 4 is a transverse vertical sectional view of the cabin of the airship as shown in Figs. 1 and 2, illustrating two passengers swung in their seats, by my mechanism, completely out of the cabin through open doors at the sides, respectively, of the cabin, and ready to be dropped in parachutes from the davits, and further showing the seats released and dropped from the davits and about to withdraw the parachutes from the airship so that the parachutes may open and descend, with safety to their occupants, to terra firma.
Fig. 5 is an elevation of two parachutes carrying chairs respectively of the airship cabin and shown released from the airship and opened and in the act of descent through space.
Fig. 6 is a fragmentary transverse vertical section of the airship cabin as illustrated in Figs. 1 to 4 inclusive, showing in rear elevation one of the passenger chairs of the cabin as it appears in the cabin with the elevating cable and the parachute rope connected thereto and slack.

Each of the seats 3 is formed with side arms 84 and a back 85. A pair of links 86 and 87 are arranged at each side of each seat 3, which links are pivotally connected together at one end. The other end of the links 86 are connected to the forward end of the arms 84 respectively of the seat, while the other end of the links 87 are respectively connected to the ends of a link 88. Normally the links 86 rest adjacent the outside of the seat arms 84 and the links 87 rest adjacent the side edges of the back 85 of the seat, while the link 88 rests over the upper edge of the back of the seat, as illustrated in Figs. 6 and 7 of the drawings. The upper link 88 is connected at its ends to one end of ropes 89 respectively, the other end of which ropes are connected to the upper corners of the seat back 85. A ring 90 is connected to the middle of the upper link 88. Emergency straps 93 are connected to the seats where the arms 84 join the backs 85 of the seats, which straps the passengers, when warned by the pilot, may fasten around their bodies to hold them in the seats.

Davits 94 are mounted on the outside of the cabin 2 adjacent the doors 4 respectively. Each of said davits comprises a tube formed with a vertical member 95 and a horizontal arm 96 extending from the upper end of said vertical member. The vertical members of the davits are journaled at the forward edges of the doors 4 respectively in bearings 97 and 98 which are secured to the side walls of the cabin on the outside thereof; the elbows 99 connecting the vertical members with the horizontal arms of the davits resting and turning upon the bearings 98. Pulleys 100 are mounted under the lower ends of the vertical members 95 of the davits respectively in brackets 101 secured to the cabin 2. Pulleys 102 are mounted in the elbows 99 of the davits and pulleys 103 are mounted in the outer end of the davit arms 96. Cables 104 extend through openings 105 in the lower part of the side walls of the cabin over the pulleys 100, up through the vertical members 95 of the davits, through the davit elbows 99 over the pulleys 102 and through the davit arms 96 over the pulleys 103 in the outer end of said arms. The ends of the cables 104 extending through the outer ends of the davit arms 96 are detachably connected to the rings 90 on the seat suspension link 88, by means of trip hooks 105. Each of said trip hooks comprises a hook member 106 and a closure member 107, which members are pivoted together at 108. The lower end of the hook member 106 is curved in the form of a hook 109 which engages the ring 90 on the seat suspension link 88. The upper end of the member 106 is connected to one end of a rope 110 which extends into a box 111 through an opening 112 therein, the other end of said rope being secured in said box, and said box being secured to the outside of the cabin above the upper rear corner of the opening for a door 4, which corner is provided with a notch 113 through which normally extends the rope 110 and a cable 104 from a davit arm 96 into the cabin, the end of said cable being secured to the upper end of the closure member 107 of the trip hook 105. The hook 105 suspended by the cable 104 normally swings the closure member 107 of the hook against the hook 109 and closes the end of the hook, whereby the ring 90 in the middle of the seat link 88 is maintained in engagement with said hook.

A parachute 114 is detachably mounted outside the cabin 2 below each door 4 in a leather cover 115 which is buttoned to the cabin by snap buttons 116, and the suspension rope 117 of the parachute extends upwardly along the vertical member 95 and under the horizontal arm 96 of a davit 94 through the notch 113 of a door opening into the cabin and is connected to the ring 90 on a seat link 88. The parachute rope 117 is enclosed in a cover 118 which is detachably secured to the vertical member 95 and horizontal arm 96 of a davit 94 by snap buttons 119. The rope 110, cable 104 and parachute rope 117 of each seat 3 are enclosed within a cover 120 which extends updownwardly from the ring 90 along the upper edge of the back of the seat and upwardly along the inside of the side wall of the cabin to a notch 113 in the rear upper corner of a door opening, and said cover is detachably secured to said upper edge of the seat back and to said cabin wall by snap buttons 121; the trip rope 110, cable 104 and parachute rope 117 being slack when enclosed by the cover 120 and while the seats are in their normal position for carrying passengers in the cabin of the airship (see Fig. 6).

From the lower end of the vertical member 95 of each davit 94 projects an arm 122 which is connected to one end of a link 123, the other end of which link is connected to one end of a lever 124 fulcrumed in the lower structure of the cabin below the floor 10, the other end of which lever extends over the chain 63 in the path of travel of the dog 64 when the davit is in its normal position with its arm 96 against the side of the cabin.

Each cable 104 extends from a pulley 100 through an opening 105 into the cabin 2 over a pulley 125 and around a drum 126 to which the cable is secured, said pulley and drum being suitably mounted in the lower structure of the cabin below the cabin floor, and the drum being secured on a vertical shaft 127 suitably journaled in the lower structure of the cabin. On the drum shaft 127 is secured a sprocket 128 between the reaches of the chain 63, but with the chain normally out of engagement with said sprocket. Each sprocket 126 is engaged by, and normally held against rotation by a sliding dog 129 which also holds the drum 126 against rotation and prevents winding of the cable 104 thereon. Associated with each sprocket 128 is a presser roller 130 journaled in one end of an arcuate lever 131 adjacent the outside of one reach of the chain 63, which lever is fulcrumed in the lower structure of the cabin 2. The other end of the lever 131 and the outer end of the dog 129 are connected to one end of a link 132, the other end of which link is connected to one end of an operating lever 133 fulcrumed in the lower structure of the cabin. The other end of the operating lever 133 extends over the chain 63 in the path of travel of the dog 64. A spring 134 connected at one end to the lever 133 and at its other end to the lower structure of the cabin normally holds said lever retracted completely in position to be engaged by the dog 64 and in position holding the dog 129 in engagement with the sprocket 128 and the presser roller 130 out of pressure contact with the adjacent reach of the chain 63. Idler sprockets 135 are journaled in the lower structure of the cabin 2 on the inside of the reach of the chain which extends between the sprockets 126 and rollers 130, which sprockets engage said reach of the chain to enable the presser rollers 130 to press said reach of the chain effectively into engagement with the sprockets 126, for the purpose hereinafter fully described.

Trough-shaped guides 136 are mounted in the lower structure of the cabin in which the chain 63 travels and is guided.

Figures 9, 10:
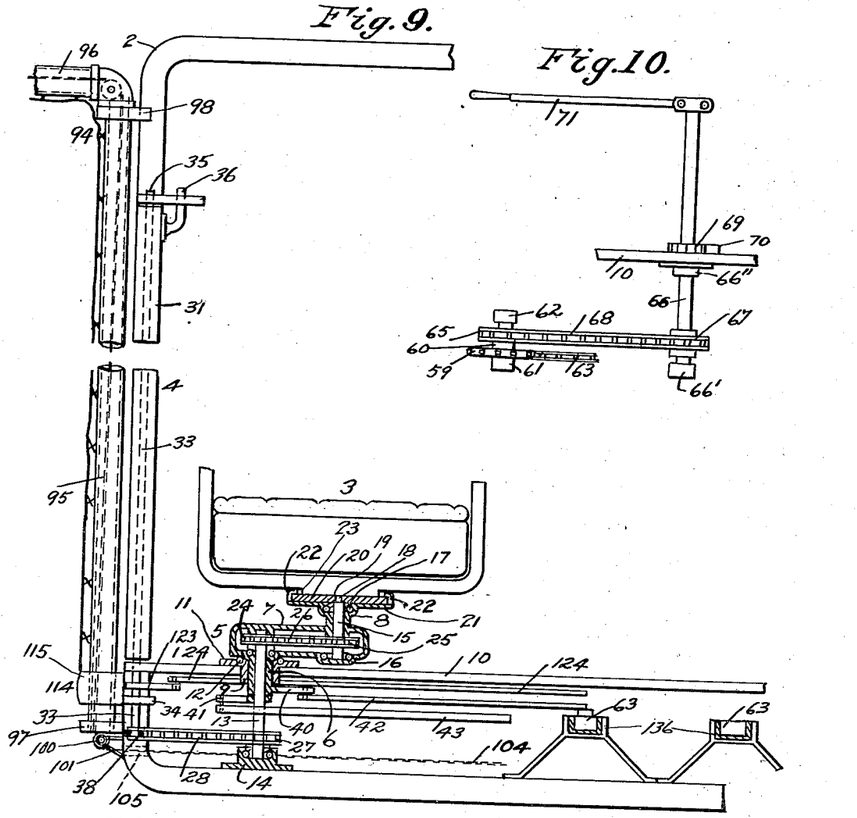
Fig. 9 is an enlarged fragmentary transverse vertical section of an airship cabin embodying my invention.
Fig. 10 is an elevation of the pilot's operating arm and connections for operating my invention.
Figure 13:
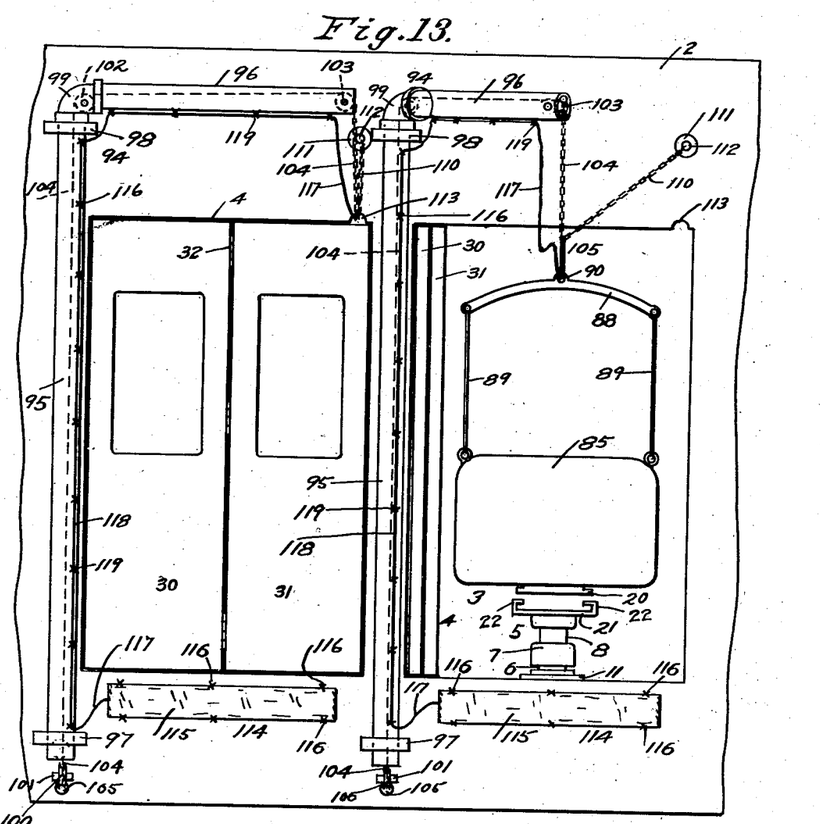
Fig. 13 is an enlarged fragmentary side elevation of an airship cabin illustrating the means on the outside of the cabin for discharging the passengers from the cabin in parachutes.
Figure 14:
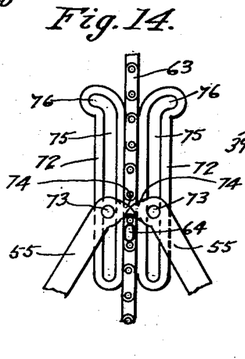
Fig. 14 is a fragmentary plan view illustrating certain parts of the mechanism for swinging the seats into position for discharging the passengers in parachutes from the cabin of the airship.
Figure 16:
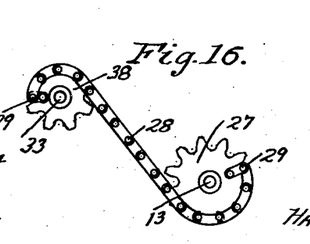
Fig. 16 is a plan view of the lower part of the mechanism for turning the seats to pass backwardly through the doors as the doors are opened.

The operation of my invention is as follows:

When an emergency arises that makes it necessary for the passengers to be let out of the airship, the pilot first gives warning whereupon the passengers strap themselves in their seats 3 by the emergency straps 93. (Figs. 6, 7, and 8.) The pilot then grasps the handle 71 (see Fig. 10) and rotates the shaft 66, sprocket 67 and ratchet 69 in a clockwise direction. The rotation of the sprocket 67, through chain 68, rotates the sprocket 65, shaft 60 and sprocket 59 also in a clockwise direction, whereupon the sprocket 59 drives the chain 63 in the direction of the arrow a (Fig. 1) which carries the dog 64 forwardly. The dog 64 first engages the free end of the lever 133 of the operating mechanism of the last two seats 3 which are arranged opposite each other across the aisle therebetween, and swings said lever forwardly, which lever, through link 132 withdraws the dog 129 from the sprocket 128, and through levers 132 and 131, swings the presser roller 130 against the adjacent reach of the chain toward the sprocket 128. The dog 64 also engages the lugs 74 of the rods 55 of the operating mechanism of said last two seats and draws said rods forwardly, which swings the bell cranks 54 clockwise, whereupon the seat cranks 5, through said bell cranks, draw bars 44, links 42 and arms 40, are swung counterclockwise a short distance which swing said seats correspondingly and rearwardly part way into the aisle between said seats as illustrated in dotted lines in Fig. 1 of the drawings. In this position of the seats the pins 73 (Fig. 13) in the forward ends of the rods 55 engage the curved forward ends 76 of the slots 75 in the guide plates 72, and the forward ends of said rods are swung away from the adjacent reach of the chain 63, whereupon the dog 64 escapes the lugs 74 on the forward ends of said rods and engages the adjacent ends of the levers 80. Said dog still engaging and swinging the levers 133, the chain 63 is pressed by big roller 130 through levers 133, 132 and 131, into effective engagement with the sprocket 128, whereupon said sprocket, shaft 127 and drum 126 are rotated clockwise and the cable 104 is wound on the drum. The dog 64 engaging the levers 80 swings said levers and opens the rearmost doors 4 adjacent said rearmost seats, through the medium of said levers, links 79, levers 78 and links 77, the door sections 30 being caused to swing inwardly within the cabin and the door sections 31 being caused to swing past the seats and against the outside of the door sections 30 by the engagement of the pins 36 with the slotted guides 37 as indicated in Fig. 9 and in dotted lines in Fig. 1. As the levers 80 are swung forwardly, by the dog 64, and said doors are swung open, the seat cranks 5 and said seats 3 are swung outwardly through the medium of said levers, bell cranks 49, links 43 and arms 41 until said seats extend part way through the door openings, while said seats are rotated clockwise by means of the door hinge shafts 33, through the medium of the sprockets 38, chains 28, sprockets 27, shafts 13, sprockets 24, chains 26, sprockets 25, shafts 15, keys 18 and key hole plates 20, until the backs of said seats are turned outwardly through the door openings, as indicated in dotted lines in Fig. 1, during which operation the cables 104 are completely wound on the drums 126 and drawn taut, the snap buttons 121 being thereby disengaged and the cover 120 ripped off the wall of the cabin and the upper edge of the backs of the seats 3, and the links 88 drawn above the heads of the passengers in the seats and the links 86 and 87 drawn out straight and the ropes 89 drawn taut, (as shown in Fig. 8), until the seats are raised off the upper ends of the crank standards 8, the seats at this time, with their backs turned outwardly, being in such position that the key plates 20 are swung out from under the clips 22 to allow the seats to be raised off said crank standards. (Fig. 3.) The dog 64 at this time has escaped the levers 80 and engaged the levers 124, and as said levers are swung by said dog, the davits 94 for said two rearmost seats are swung outwardly through the medium of said levers, links 123, and arms 122, until the trip hook ropes 110 are drawn out of the boxes 111 and drawn taut, whereby the trip hook members 106 are swung outwardly and the hooks 109 of said members are swung away from the hook closure members and out of engagement with the seat rings 90, whereupon the seats with the passengers therein drop by gravity from the davits at the sides of the cabin 2, and in dropping the snap buttons 119 are disengaged and the covers 118 ripped from the davits 94 and the snap buttons 116 are disengaged and the parachute covers 115 ripped off the cabin 2 by the parachute ropes 117, which are pulled down by the falling seats and which carry with them the parachutes 114, (Fig. 4) and as the parachutes fall through space they open (Fig. 5) and descend slowly with the seats 3 and their occupants until the occupants reach the ground safely.

When the davits of the two rearmost seats have been swung out by the engagement of the dog 64 with the said levers 124, the dog escapes said levers and travels forwardly with the chain and engages the rods 55 and levers 133, 80 and 124 successively of the next forward passenger discharging mechanism and operates said mechanism, whereby the passengers in the next forward seats at opposite sides of the cabin are discharged like the two rearmost passengers as above described, but before the doors opposite said next forward pair of seats are opened by said next forward passenger discharging mechanism, the pins 83 on the levers 80 of said mechanism engage the ends of the slots 82 in the rods 81 connecting the rearmost and next forward passenger discharging mechanisms, and through the medium of said rods, and the levers 80, links 79, levers 78 and links 77, of the previously operated rearmost passenger discharging mechanism, close the doors opposite said two rearmost seats, and prevent air from entering the cabin through said rearmost doors, when the next forward doors are opened by the next forward passenger discharging mechanism.

The remaining passenger discharging mechanisms are operated progressively forward like the two rearward passenger discharging mechanisms as above described, the doors operated by each mechanism, except the foremost doors, being closed before the next forward doors are opened, thus preventing air of sufficient pressure from entering and wrecking the cabin.

By means of the folding doors and the initial inwardly swinging movement of the seats to permit opening of the doors, it is possible to discharge the seats with the passengers therein through a door opening of minimum width.

By removing the seats backwardly from the cabin through the doors the danger of the passenger's feet or legs being caught in any part of the cabin is eliminated.

In this specification and the annexed drawings, I disclose my invention in what I consider a desirable and practical form, but I do not limit my invention to such form because it may be embodied in other forms and I desire it to be understood that in and by the claims of this specification I intend to cover my invention in whatever form it may be embodied.

Having described my invention I claim:

1. In a life preserving mechanism for airships, seats for passengers, parachutes connected to said seats, and means, operated by the pilot of the airship, for swinging said seats, with the passengers therein, out of the airship, and dropping the seats and passengers in said parachutes.

2. In a life preserving mechanism for airships, in combination with the cabin of an airship, constructed with a plurality of doors, seats detachably mounted in said cabin opposite said doors respectively, parachutes connected to said seats, means for opening said doors successively, means for swinging said seats with the passengers therein successively out of the cabin through said open doors respectively, means for releasing and dropping said seats with their passengers in said parachutes, when said seats are swung out of the cabin, and means for closing each door, after a seat and passenger are swung therethrough out of the cabin, before the next door is opened for swinging the next seat and passenger out of said door.

3. A life preserving mechanism as characterized by claim 2, in which the means for opening the doors, means for swinging the seats through the open doors, means for releasing and dropping the seats when swung through the open doors and the means for closing each open door before the next door is opened, are all operated and controlled by the pilot of the airship.

4. In a life preserving mechanism for airships, in combination with an airship cabin constructed with a plurality of doors, mounted to swing inwardly into open position, each of said doors being made in two sections, one section being hinged to the cabin to swing inwardly into open position and the other section being hinged to the first section to swing thereagainst when the door is swung open, means for swinging said doors open, seats mounted in said cabin adjacent said doors respectively, means for swinging said seats with the passengers therein first inwardly to allow the doors to open, means for swinging said seats outwardly through the open doors, parachutes connected to said seats, and means for releasing and dropping the seats and their occupants in said parachutes when the seats are swung out of the cabin through the open doors.

5. A life preserving mechanism for airships as characterized by claim 4 including means for turning the seats to pass out backwardly through the open doors of the cabin.

6. In combination with the cabin of an airship constructed with a door, a seat mounted in the cabin adjacent said door, means for opening said door, means for swinging said seat out of the cabin through said open door, means operated by the door for turning the seat to pass backwardly out through said door, a parachute connected to said seat, and means for dropping the seat with said parachute when the seat is swung out of the cabin.

7. In combination with the cabin of an airship constructed with a door, a seat mounted in the cabin adjacent said door, means for first swinging said seat inwardly to allow the door to open, means for opening the door, means for swinging said seat out of the cabin through said open door, a parachute connected to said seat, and means for dropping said seat with said parachute when the seat is swung out of the cabin.

8. In combination with the cabin of an airship constructed with a door, a seat mounted in the cabin adjacent said door, means for first swinging said seat inwardly to allow the door to open, means for opening the door, means for swinging said seat out of the cabin through said open door, means for turning the seat to pass backwardly out through said door, a parachute connected to said seat, and means for dropping said seat with said parachute when the seat in swung out of the cabin.

9. In combination with the cabin of an airship constructed with a door, a seat mounted in the cabin adjacent said door, means for opening said door, means for swinging the seat part way through the open door, a davit, a cable carried by said davit and detachably connected to said seat, means for drawing said cable taut to lift said seat off its mounting, a parachute connected to said seat, means for swinging said davit outwardly to swing said suspended seat on said cable completely through said open door, and means for releasing said seat from said cable when the seat is swung out by said davit from the cabin.

10. In combination with the cabin of an airship constructed with a door, means for opening said door, in said cabin, a crank, a seat detachably mounted on said crank adjacent said door, a parachute connected to said seat, means for swinging said crank to swing said seat part way through the open door, a davit, a cable carried by said davit and detachably connected to said seat, means for drawing said cable taut to lift said seat off said crank when the seat is part way through said door, means for swinging said davit outwardly to swing the seat suspended on said cable completely through said open door, and means for releasing said seat from said cable when the seat is swung out from the cabin.

11. In combination with the cabin of an airship constructed wth a pluralty of doors, a plurality of carriers mounted within said cabin, a parachute connected to each of said carriers, means for opening said doors successively, means for removing said carriers respectively from the cabin through said doors when opened and dropping the carriers with their parachutes, and means for closing each of said doors when a carrier has been removed therethrough from the cabin before another door is opened for discharging another carrier therethrough.

12. In combination with the cabin of an airship constructed with a swinging door, a sprocket secured on the door pivot, a crank mounted in the cabin formed with a fulcrum sleeve, a hollow arm extending from said sleeve and a hollow standard upstanding from the outer end of said arm, a vertical seat swivel shaft journaled in said standard, a seat detachably mounted upon the upper end of said standard and detachably keyed to the upper end of said swivel shaft, means for swinging said crank to swing said seat part way through said door when open, a shaft extending through the fulcrum sleeve of said crank, sprockets on said latter shaft and said swivel shaft respectively, a chain extending over said sprockets within said crank arm, a second sprocket on said shaft, a chain extending over said latter sprocket and over the sprocket on the door pivot for turning the seat to pass backwardly through said door when opened, a davit, a cable extending through said davit and detachably connected to said seat, means for drawing said cable taut to lift said seat off said crank standard when the seat is swung part way through said door, means for swinging said davit outwardly to swing the lifted seat completely outwardly through said door, a parachute connected to said seat, and means for releasing said seat from said cable when the seat is swung out on said davit.

13. In combination with the cabin of an airship constructed with a plurality of doors along a side thereof, an endless chain extending lengthwise of the cabin, sprockets at the rear and front ends respectively of the cabin over which said chain travels, a dog on said chain, operating means in the front end of the cabin to be operated by the pilot of the airship to rotate said front sprocket to cause said chain to travel around both of said sprockets, passenger seats adjacent said doors respectively, parachutes connected to said seats respectively and means engaged by the dog on said chain for opening said doors successively and for swinging said chairs respectively through said open doors and dropping said chairs with their parachutes.

14. A life preserving mechanism for airships as characterized in claim 13 including means connecting the mechanisms for opening said doors, whereby the door, through which a seat is discharged, is closed as a succeeding door is opened by its opening mechanism.

15. In combination with an airship cabin constructed with a door, a seat detachably mounted in said cabin adjacent said door, means for opening said door, means for swinging said seat out of the cabin through said open door, a cable connected to said seat, a parachute, the rope of which being connected to said seat, said cable and said parachute rope being slack and extended along the cabin wall and the seat while the seat is in the cabin, a snap button cover fastened to the cabin wall and the seat over said slack cable and parachute rope, means for drawing said cable taut and ripping said cover from the cabin wall and the seat, when the seat is swung out of the cabin through said door, for elevating the seat from its mounting, and means for releasing the seat from said cable when the seat is swung out of the cabin.

16. In combination with an airship cabin constructed with a door, a seat detachably mounted in said cabin adjacent said door, means for opening said door, means for swinging said seat out of the cabin through said open door, a cable connected to said seat, a davit through which said cable extends, a parachute, a snap button cover fastened to the cabin over said parachute, the parachute suspension rope extending along said davit and connected to said seat, a snap button cover fastened to the davit over said parachute rope, means for drawing said cable taut for elevating the seat from its mounting when the seat is swung out through said cabin door, and means for releasing the seat from said cable when the seat is so elevated whereby the seat and its occupant drop by gravity and rip said rope cover from the davit and the parachute cover from the cabin.

17. In a passenger carrying airship, doors in the cabin of the airship, parachutes connected to the passengers of the airship, davits, and means, controlled by the pilot of the airship, for swinging the passengers on said davits through said doors and dropping the passengers with their parachutes from said davits when the passengers are swung out of the cabin.

HARRY P. TRUSTY.